(12) United States Patent
Wang et al.

(10) Patent No.: US 9,288,299 B2
(45) Date of Patent: Mar. 15, 2016

(54) METHOD AND APPARATUS FOR FILE SHARING IN A NETWORK

(75) Inventors: Xiaodong Wang, Saratoga, CA (US); Shangpin Chang, San Jose, CA (US); Steve Xing Gu, Palo Alto, CA (US)

(73) Assignee: DewMobile, Inc., Santa Clara, CA (US)

(*) Notice: Subject to any disclaimer, the term of this patent is extended or adjusted under 35 U.S.C. 154(b) by 101 days.

(21) Appl. No.: 13/616,149

(22) Filed: Sep. 14, 2012

(65) Prior Publication Data

US 2014/0082519 A1    Mar. 20, 2014

(51) Int. Cl.
G06F 3/0481    (2013.01)
G06F 15/16    (2006.01)
H04M 1/725    (2006.01)
H04L 29/08    (2006.01)

(52) U.S. Cl.
CPC ........... H04M 1/72522 (2013.01); H04L 67/06 (2013.01); H04M 1/72552 (2013.01); H04M 2250/12 (2013.01); H04M 2250/22 (2013.01); H04M 2250/64 (2013.01)

(58) Field of Classification Search
CPC .............. H04L 29/06; H04L 29/08549; H04L 29/08072; H04L 12/1822; G06F 3/0481; G06F 9/44543; G06F 3/04883; G06F 3/0488; G06F 1/1626; G06F 3/01; G06F 3/016; G06F 3/017; G06F 3/041; G06F 3/048; G06F 9/4443; G06F 15/16; G06Q 10/10; H04N 7/15
USPC ......... 715/700, 733, 748, 751, 753, 764, 765, 715/781, 804, 808, 809, 863, 864; 345/169, 345/173
See application file for complete search history.

(56) References Cited

U.S. PATENT DOCUMENTS

| | | | |
|---|---|---|---|
| 7,580,348 B2 | 8/2009 | Maruyama et al. | |
| 8,348,149 B1 | 1/2013 | Boudville | |
| 8,516,050 B1* | 8/2013 | Chapweske et al. | 709/204 |
| 8,849,268 B2* | 9/2014 | Cho et al. | 455/418 |
| 8,933,949 B2* | 1/2015 | Reeves et al. | 345/522 |
| 8,990,406 B2* | 3/2015 | Doss et al. | 709/227 |
| 2006/0236325 A1 | 10/2006 | Rao et al. | |
| 2007/0174787 A1* | 7/2007 | Rhee | 715/810 |

(Continued)

FOREIGN PATENT DOCUMENTS

WO    WO 2014/033199 A1    3/2014

OTHER PUBLICATIONS

Non-final Office Action dated Dec. 26, 2013, issued in related U.S. Appl. No. 13/615,982 (17 pages).

(Continued)

*Primary Examiner* — Xiomar L Bautista
(74) *Attorney, Agent, or Firm* — Finnegan, Henderson, Farabow, Garrett & Dunner, LLP

(57) ABSTRACT

A method for transferring files from a first mobile electronic device to one or more second mobile electronic devices. The method includes detecting a contact with a screen of the first mobile electronic device at an icon in a user interface of the first mobile electronic device, where the icon represents a file to be shared. The method further includes triggering transferring of the file when one of the following actions is detected: a swinging of the first mobile electronic device while contact with the screen is maintained; a flicking gesture to flick the icon toward a sharing area in the user interface; or a dragging of the icon to the sharing area and a releasing of the contact.

12 Claims, 16 Drawing Sheets

(56) References Cited

U.S. PATENT DOCUMENTS

| | | |
|---|---|---|
| 2007/0230575 A1 | 10/2007 | Han |
| 2007/0265023 A1* | 11/2007 | Bengtsson et al. ............ 455/466 |
| 2010/0241711 A1* | 9/2010 | Ansari et al. .................. 709/205 |
| 2012/0159394 A1* | 6/2012 | Vuong ........................... 715/833 |
| 2012/0239618 A1* | 9/2012 | Kung ............................ 707/621 |
| 2013/0050259 A1 | 2/2013 | Ahn et al. |
| 2013/0246558 A1* | 9/2013 | Bacastow ...................... 709/217 |
| 2013/0318159 A1 | 11/2013 | Earnshaw et al. |
| 2013/0325949 A1 | 12/2013 | Virani et al. |
| 2013/0344812 A1 | 12/2013 | Dees et al. |
| 2014/0067929 A1* | 3/2014 | Kirigin et al. ................. 709/204 |
| 2015/0016417 A1 | 1/2015 | Dees et al. |
| 2015/0230280 A1* | 8/2015 | Dees ................... H04W 76/023 455/39 |

OTHER PUBLICATIONS

Final Office Action dated May 8, 2014, issued in related U.S. Appl. No. 13/615,982 (21 pages).

Non-final Office Action dated Aug. 25, 2014, issued in related U.S. Appl. No. 13/615,982 (20 pages).

Final Office Action dated Dec. 10, 2014, issued in related U.S. Appl. No. 13/615,982 (22 pages).

Non-final Office Action dated May 5, 2015, issued in related U.S. Appl. No. 13/615,982 (31 pages).

Final Office Action dated Aug. 27, 2015, issued in related U.S. Appl. No. 13/615,982 (34 pages).

* cited by examiner

METHOD AND APPARATUS FOR FILE SHARING IN A NETWORK

TECHNOLOGY FIELD

The present disclosure relates to mesh network and mesh network nodes.

BACKGROUND

Mobile electronic devices, such as cell phones and mobile media players, have been more and more popular in people's daily life. Transferring files between mobile electronic devices has become an increasing need. A conventional way to transfer a file between two mobile electronic devices is to use, for example, a personal computer as a storage relay. The user first connects a first mobile electronic device to the computer, transfers the file from the first mobile electronic device to the computer, connects a second mobile electronic device to the computer, and then transfers the file from the computer to the second mobile electronic device. However, in this conventional method, an extra device (e.g., the personal computer) has to be used, and usually cables are also needed, which could be time consuming and cumbersome.

Bluetooth technology can also be utilized for file transfer between mobile electronic devices. However, bluetooth technology usually cannot provide a high speed file transfer. In addition, the transfer distance of a bluetooth device is relatively short.

WiFi technology can provide a longer transfer distance and higher transfer speed. However, in a conventional implementation of the WiFi technology, an access point (AP) is usually needed. The access point functions as a wireless network relay between the two mobile electronic devices and a personal computer, which plays a role similar to the personal computer described above for storage relay. In a network formed by an AP and multiple mobile electronic devices, if the AP is disconnected, the entire network is destroyed, and the connections between different mobile electronic devices are disrupted.

Therefore, there is a need for a sturdy, high-speed, relatively long-distance, direct wireless connection between or among multiple mobile electronic devices. There is also a need for an application that can realize such a connection.

SUMMARY

In accordance with the present disclosure, there is provided a method for transferring files from a first mobile electronic device to one or more second mobile electronic devices. The method includes detecting a contact with a screen of the first mobile electronic device at an icon in a user interface of the first mobile electronic device, where the icon represents a file to be shared. The method further includes triggering transferring of the file when one of the following actions is detected: a swinging of the first mobile electronic device while contact with the screen is maintained; a flicking gesture to flick the icon toward a sharing area in the user interface; or a dragging of the icon to the sharing area and a releasing of the contact.

Also in accordance with the present disclosure, there is provided a method for transferring a file from a first mobile electronic device to a second mobile electronic device. The method includes detecting a contact with a screen of the first mobile electronic device at a first icon in a user interface of the first mobile electronic device, where the first icon represents the second mobile electronic device. The method further includes detecting a selection of a second icon in the user interface while contact with the screen at the first icon is maintained, where the second icon represents a file to be transferred. The method also includes triggering transferring of the file when the contact with the screen at the first icon is released.

Also in accordance with the present disclosure, there is provided a method for sharing files among a plurality of mobile electronic devices. The method includes sending, by a first mobile electronic device, a first connection request to a second mobile electronic device, where the first connection request contains first file information about a first file to be shared by the first mobile electronic device. The method further includes receiving, by the first mobile electronic device, a first acknowledgement message from the second mobile electronic device.

It should be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Embodiments consistent with the present disclosure include a mesh network node (MNN) application, methods for inviting new user, and methods for sharing files among users.

Hereinafter, embodiments consistent with the present disclosure will be described with reference to drawings. Wherever possible, the same reference numbers will be used throughout the drawings to refer to the same or like parts, or the same or like steps.

Figure 1:
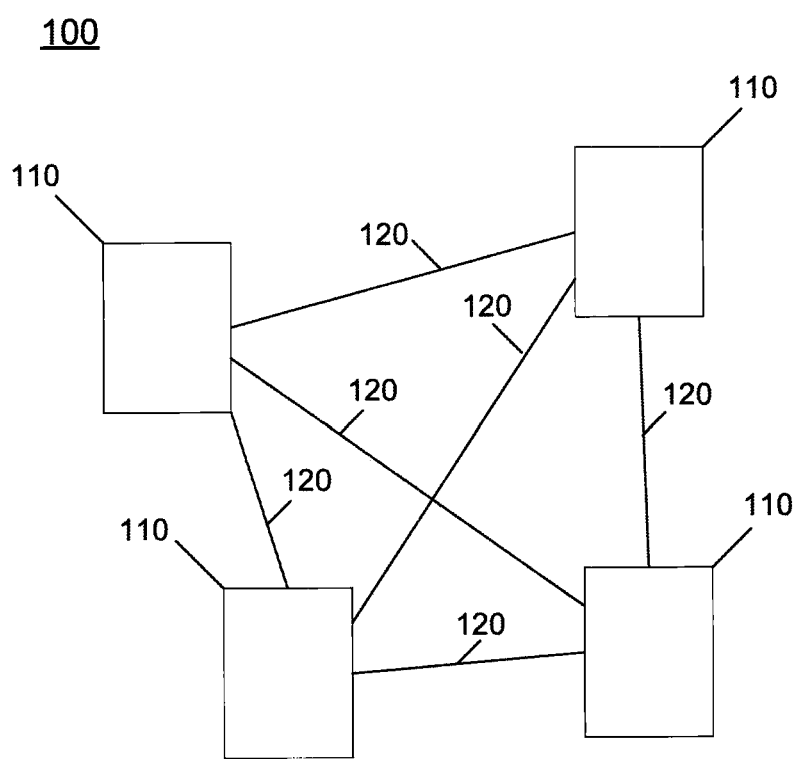
FIG. 1 is a schematic view of a mesh network consistent with embodiments of the present disclosure.

FIG. 1 shows a mesh network 100 consistent with embodiments of the present disclosure. The mesh network 100 comprises multiple mobile electronic devices 110. The mobile electronic devices 110 may be, for example, cell phones, tablets, laptops, or mobile media players. Any two mobile electronic devices 110 are connected with each other directly via a wireless connection 120. The wireless connection 120 may be, for example, a WiFi connection, a bluetooth connection, a near field communication (NFC) connection, and etc.

An MNN application consistent with embodiments of the present disclosure may be installed on the mobile electronic devices 110. The MNN application may be stored and installed on a computer-readable medium, such as a flash memory or a ROM, of the mobile electronic device 110. Each of the mobile electronic devices 110 having the MNN application installed thereon may function as a router, a server, and a client. As a server, the mobile electronic device may listen at, for example, a TCP port 9876 to monitor any request from other mobile electronic devices. As such, the mobile electronic devices 110 form a mesh network, within which each pair of mobile electronic devices 110 may directly communicate with each other. Removing any one of the mobile electronic devices 110 does not affect the communication between other two mobile electronic devices 110. Files can be easily shared between any two of the mobile electronic devices 110 or among any three or more of the mobile electronic devices 110.

FIGS. 2(a)-2(f) show an exemplary user interface 200 of the MNN application consistent with embodiments of the present disclosure. The MNN application is installed on a mobile electronic device 110 having a screen 130. The screen may be a touch screen.

Figure 2A:
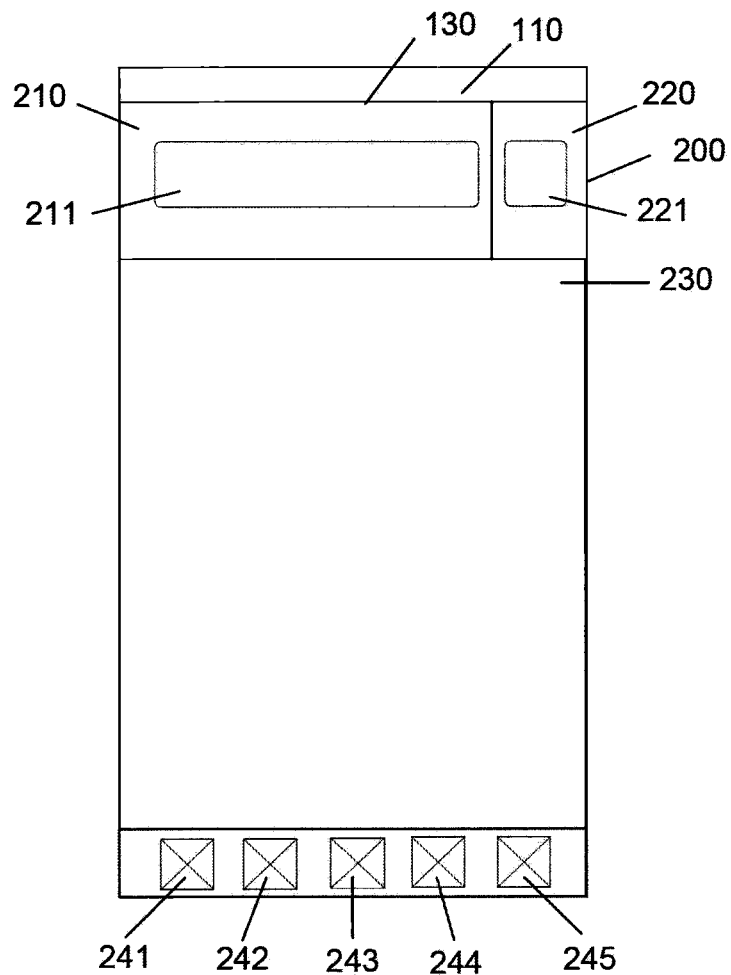
FIG. 2(a)-2(f) are schematic views of an exemplary user interface of the MNN software consistent with embodiments of the present disclosure in different situations.

The user interface 200 may include a connection and sharing area 210, an invitation area 220, and a content area 230. Depending on whether the mobile electronic device 110 is already in a mesh network consistent with embodiments of the present disclosure, different contents may be displayed in the connection and sharing area 210. Consistent with embodiments of the present disclosure, when the mobile electronic device 110 is not connected in a mesh network, a connection button 211 is displayed in the connection and sharing area 210, as shown in FIG. 2(a). A user may setup a mesh network, or search for and join a nearby mesh network by clicking on the connection button 211. In the present disclosure, a user clicking on a button or an icon may mean that the user contacts the screen of the mobile electronic device at a button or an icon in the user interface with an object, and then quickly releases the contact. The object may be any physical object, including, but not limited to, a touch pen or a part of the user's body, such as the user's finger.

When the mobile electronic device 110 is connected in a mesh network, a listing of icons 212 is shown in the connection and sharing area 210, as shown in FIGS. 2(b)-2(f). The icons 212 represent other mobile electronic devices currently connected with the mobile electronic device 110 in the mesh network.

The invitation area 220 comprises an invitation button 221 and may be used for sending an invitation to a nearby mobile electronic device to install the MNN application. The detailed process of inviting new users will be described later.

The content area 230 is used to display the files stored on the mobile electronic device 110 that may be shared with other mobile electronic devices. The files may be, for example, applications, game files, image files, audio files, or video files.

Figure 2B:
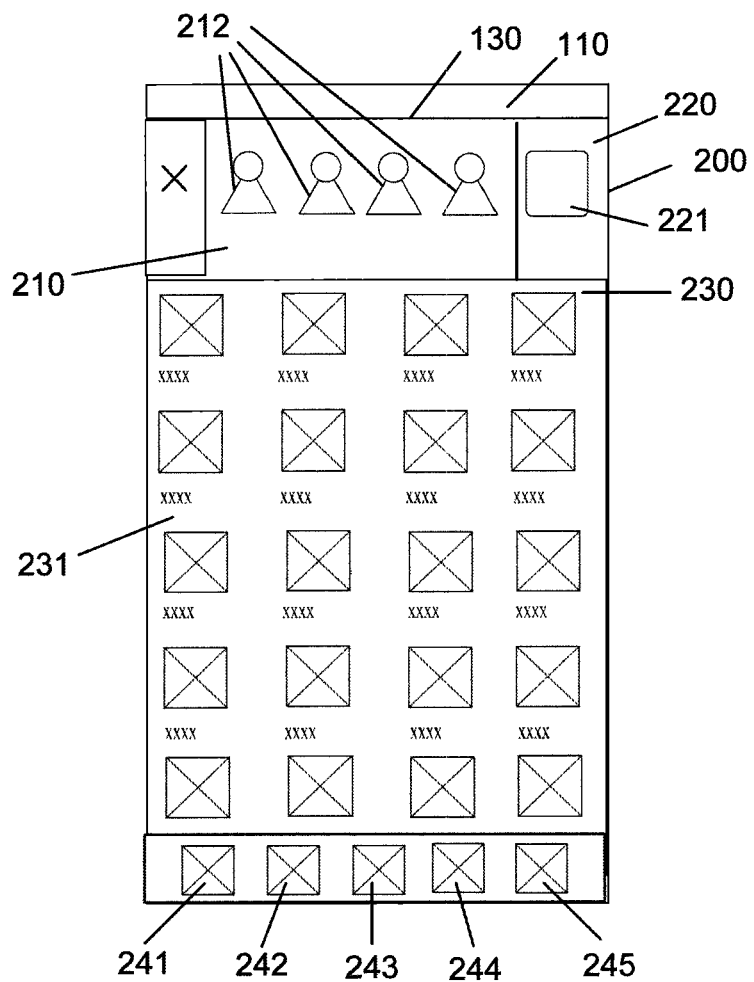
Figure 2C:
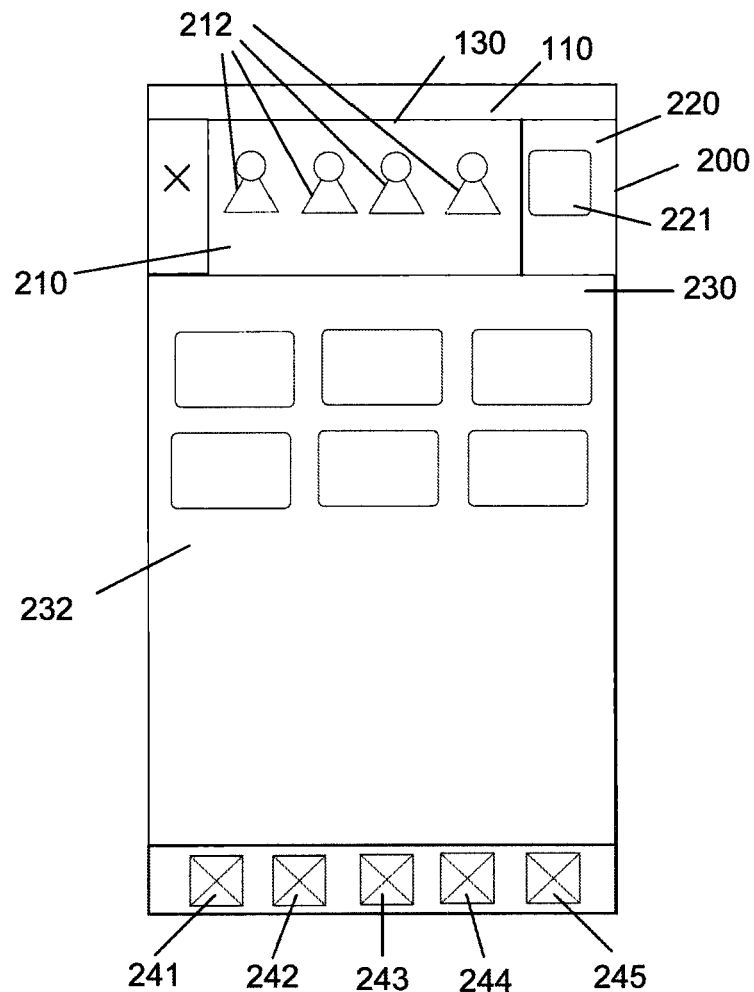
Figure 2D:
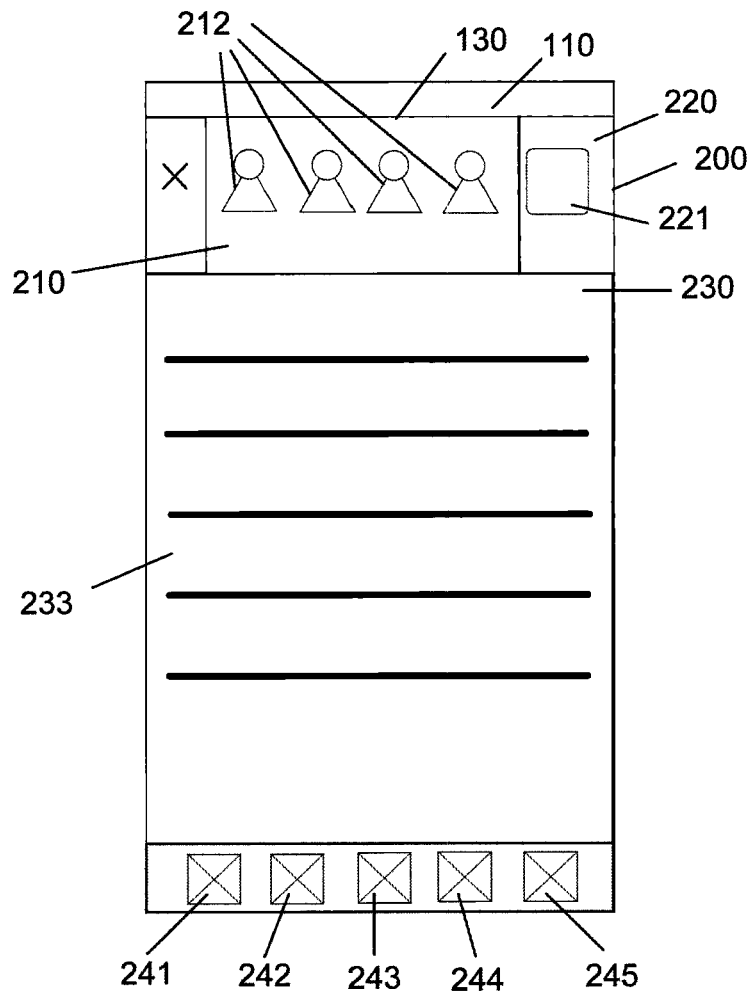

The files may be organized into different groups, with one group being displayed on one page in the content area 230 at one time. For example, as shown in FIG. 2(b), applications installed on the mobile electronic device 110 are displayed on application page 231; as shown in FIG. 2(c), photos and images stored on the mobile electronic device 110 are displayed on image page 232; and as shown in FIG. 2(d), videos and audios stored on the mobile electronic device are displayed on media page 233. In some embodiments, the files displayed on the application page 231, the image page 232, and the media page 233 may be ordered according to the sharing history. For example, recently shared files may be displayed at the top of the pages.

Figure 2E:
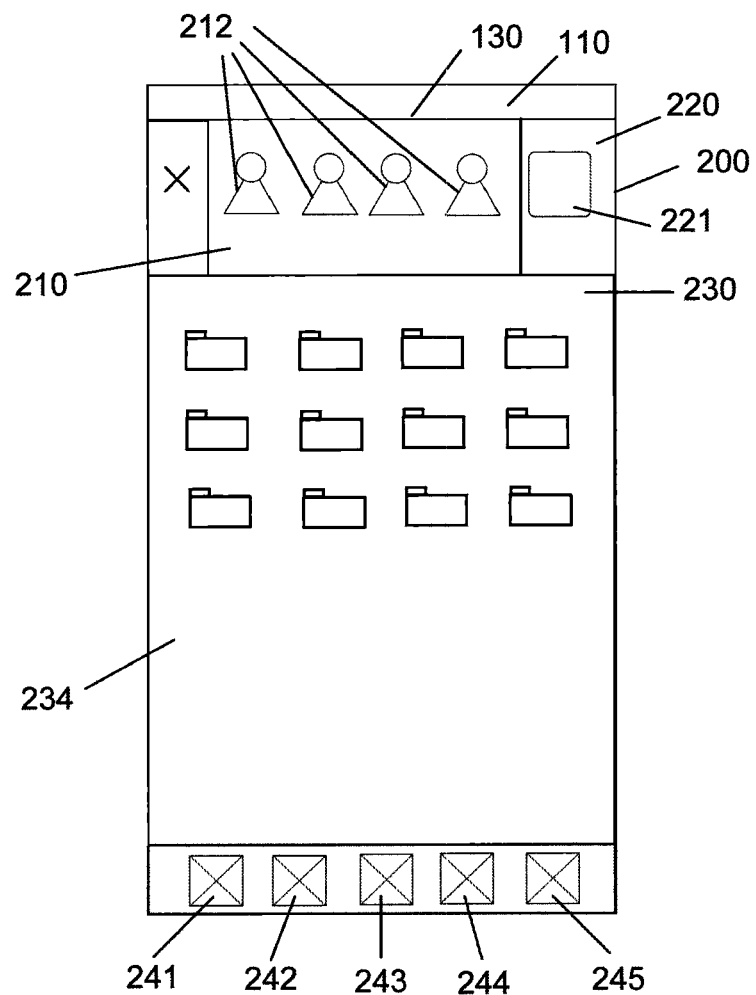
Figure 2F:
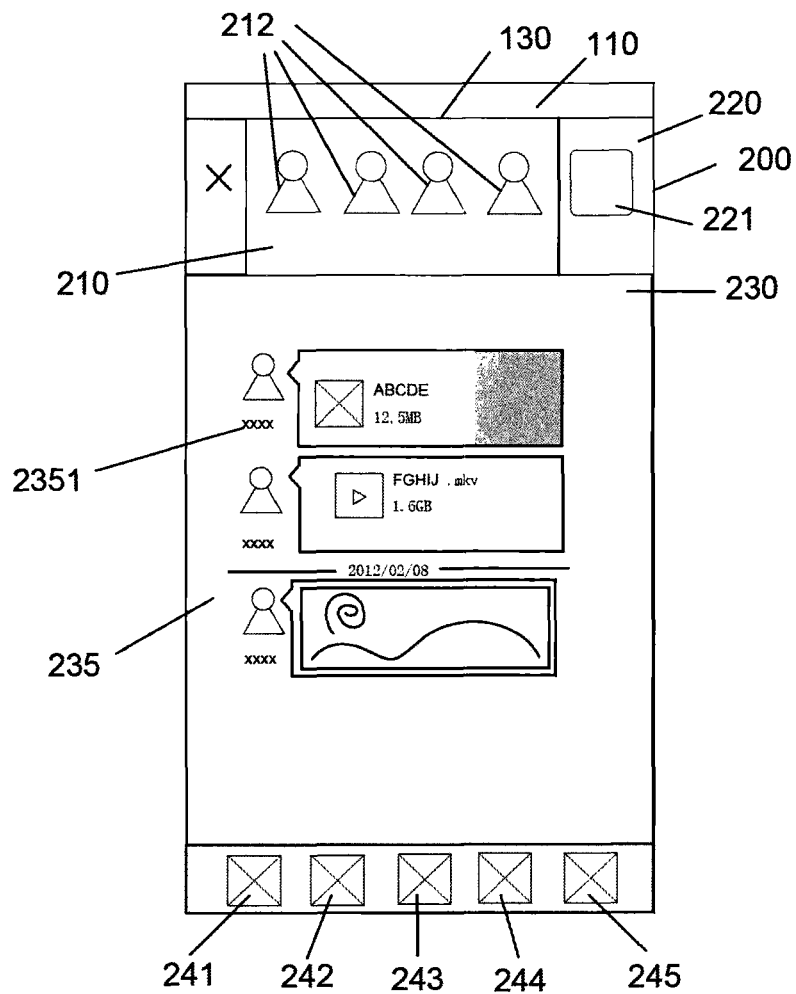

A file management page 234 can also be displayed in the content area 230, as shown in FIG. 2(e). In the file management page 234, a user can browse the files stored on the mobile electronic device 110. The content area 230 also contains a history page 235, in which a listing of files received by the mobile electronic device 110 is displayed, as shown in FIG. 2(f). Each file in the history page 235 is accompanied by a service set identifier (SSID) 2351 of the mobile electronic device that sent that file. The user of the mobile electronic device 110 can easily identify the source of the received file by its accompanying SSID 2351.

Consistent with embodiments of the present disclosure, the SSID 2351 may comprise up to 32 bytes. Methods consistent with embodiments of the present disclosure for generating the SSID 2351 will be described later in more detail.

The user may switch between different pages by sliding an object, such as his/her finger, on the screen 130. Switching between different pages can also be realized by clicking on various buttons such as application button 241, image button 242, media button 243, file management button 244, and history button 245 presented at the bottom of the user interface 200.

Figure 3:
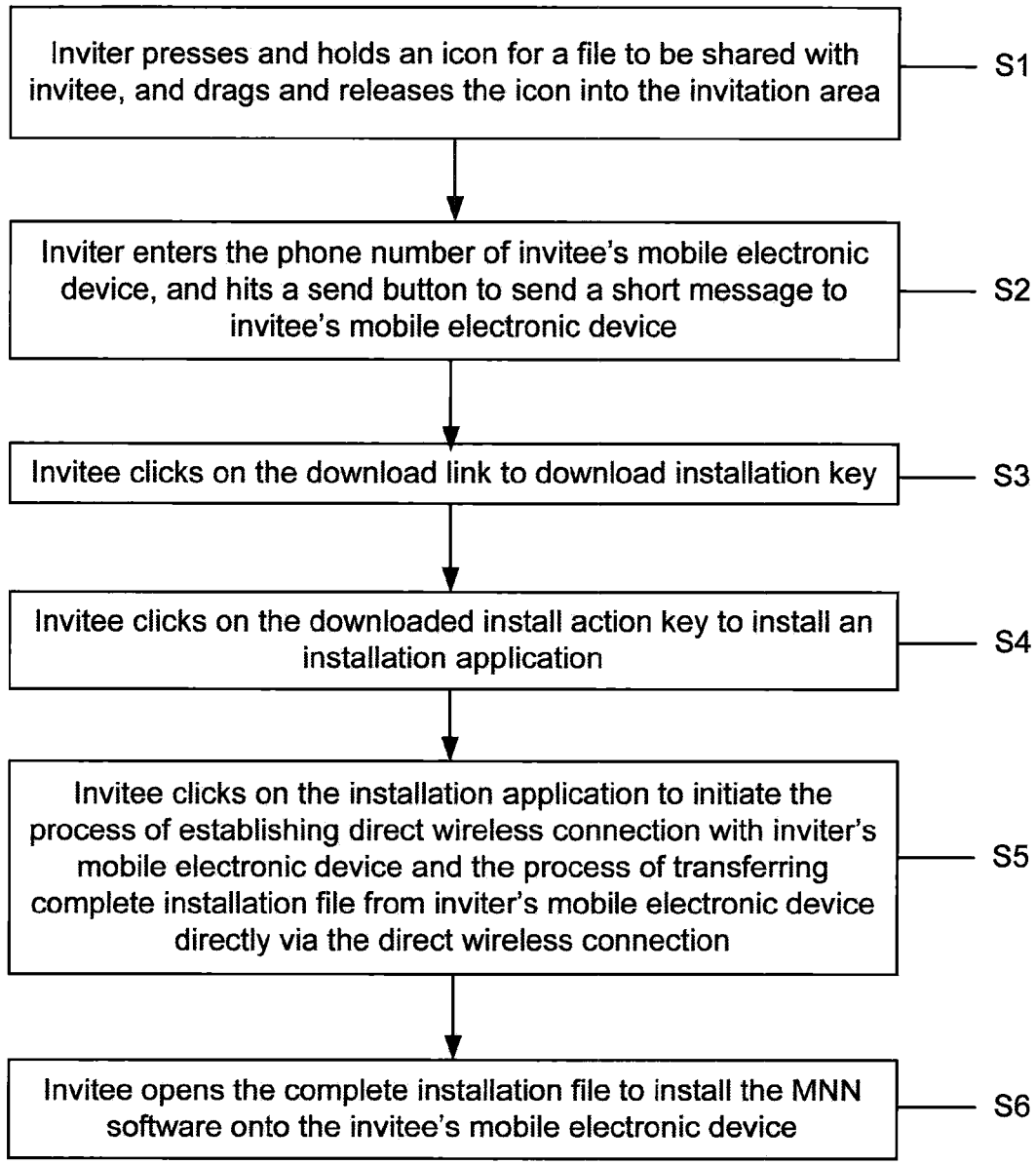
FIG. 3 is a flow chart showing an exemplary process for inviting a new user to install the MNN software consistent with embodiments of the present disclosure.

A user having an MNN application installed on his/her mobile electronic device can easily share the MNN application with another person. FIG. 3 illustrates an exemplary process for inviting a new user to install the MNN application consistent with embodiments of the present disclosure. The exemplary process in FIG. 3 is related to a scenario where an inviter having the MNN application installed on his/her mobile electronic device wishes to share a file with an invitee who does not have the MNN application installed on his/her mobile electronic device. In this scenario, therefore, the invitee needs to first install the MNN application on his/her mobile electronic device before he/she can receive the file to be shared. The process includes the following steps.

Step S1. The inviter presses and holds an icon for a file to be shared with the invitee, and drags and releases the icon into the invitation area 220. In the present disclosure, a user pressing an icon may mean that the user contacts the screen of the mobile electronic device at an icon in the user interface with an object (e.g., a finger tip). Holding an icon may mean that the contact with the screen at the icon is maintained for a period of time. Dragging an icon may mean that the object, while maintaining the contact with the screen at the icon, moves towards a certain direction such that the point of contact moves on the screen. Releasing an icon may mean that the user releases the contact with the screen at the icon.

Step S2. In a pop-up window, the inviter enters the phone number of the invitee's mobile electronic device and hits a send button to send a short message to the invitee's mobile electronic device. The short message may contain a download link indicating the location where an installation key is saved. The short message may also contain an SSID of the inviter's mobile electronic device and the invitee's phone number. The SSID of the inviter's mobile electronic device may be used by the invitee's mobile electronic device in searching for the inviter's mobile electronic device to establish a connection between the inviter's mobile electronic device and the invitee's mobile electronic device.

Step S3. When the short message is received by the invitee's mobile electronic device and displayed on its screen, the invitee clicks on the download link to download the installation key. The installation key may be a small file of about 100 kb, which may be much smaller than a complete installation file for the MNN application. The installation key may be saved on a separate server, rather than on the inviter's mobile electronic device. The separate server may be on, for example, a wide area network (WAN) or the internet. The speed for downloading from the separate server usually may be slower than the speed for transferring directly between two mobile electronic devices via a direct wireless connection consistent with embodiments of the present disclosure. Moreover, service providers often charges users by traffic. Therefore, downloading merely the smaller installation key from the server, rather than the big complete installation file, may save the user's time and reduce the cost.

Step S4. After the downloading of the installation key is completed, the invitee clicks on the downloaded installation key to install an installation application. The installation application may comprise codes used to instruct the invitee's mobile electronic device to establish a direct wireless connection with the inviter's mobile electronic device, and to initiate transferring of the complete installation file for the MNN application from the inviter's mobile electronic device to the invitee's mobile electronic device.

Step S5. After the installation application is installed, the invitee clicks on the installation application, initiating the process of establishing the direct wireless connection with the inviter's mobile electronic device and the process of transferring the complete installation file from the inviter's mobile electronic device directly via the direct wireless connection. This transfer does not go through a separate server, and thus may be faster and may not incur extra cost. Step S5 may comprise several sub-steps that may be performed by the mobile electronic devices automatically without user interaction, as shown in FIG. 4 and described below.

Figure 4:
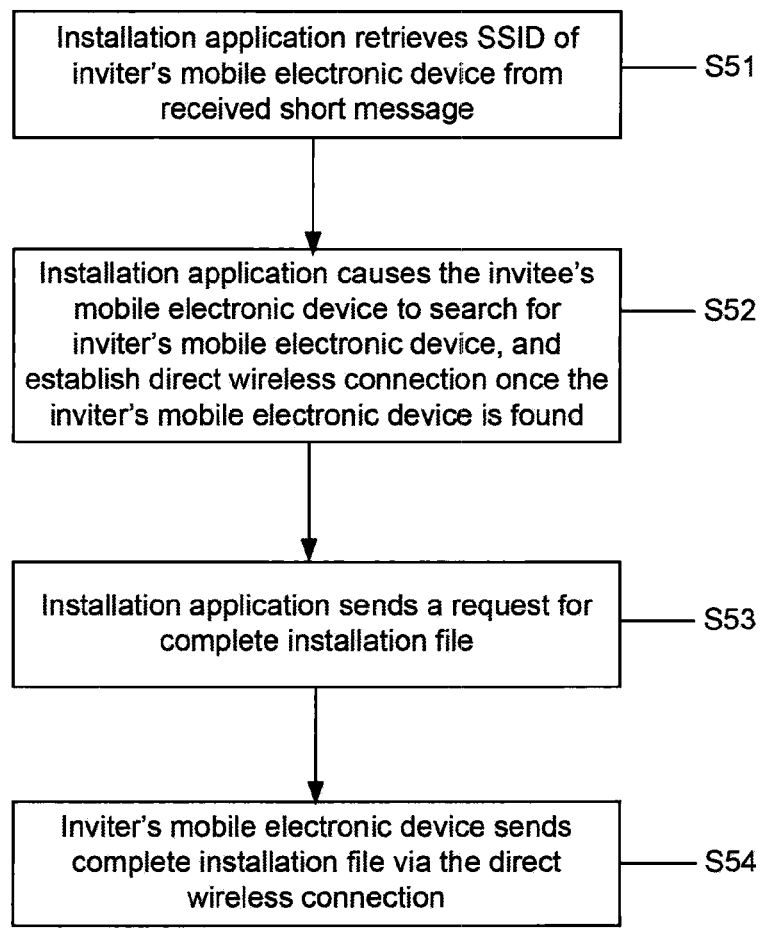
FIG. 4 is a flow chart showing sub-steps of step S5 in FIG. 3.

Referring to FIG. 4, first, at sub-step S51, the installation application retrieves the SSID of the inviter's mobile electronic device from the received short message. Second, at sub-step S52, the installation application causes the invitee's mobile electronic device to search for the inviter's mobile electronic device using the SSID of the inviter's mobile electronic device as an identifier, by searching for wireless signals sent by the inviter's mobile electronic device. Once the wireless signals sent by the inviter's mobile electronic device are detected, a direct wireless connection may be established between the inviter's mobile electronic device and the invitee's mobile electronic device. No additional wireless router is needed for such a direct wireless connection. Third, at sub-step S53, the installation application sends a request to the inviter's mobile electronic device to request the complete installation file. Fourth, at sub-step S54, the inviter's mobile electronic device sends the complete installation file to the invitee's mobile electronic device via the direct wireless connection.

Returning to FIG. 3, in step S6, after the complete installation file is transferred, the invitee opens the complete installation file to install the MNN application onto the invitee's mobile electronic device.

After the process described above is completed, the MNN application is installed on the invitee's mobile electronic device. Next, the file that the inviter wishes to share will be transferred to the invitee's mobile electronic device. In some embodiments, the MNN application on the inviter's mobile electronic device may create a log file after sending the invitation. The log file may contain information about the file to be shared. Once the MNN application is installed on the invitee's mobile electronic device, the MNN application may cause the invitee's mobile electronic device to send a message to the inviter's mobile electronic device. When the inviter's mobile electronic device receives the message, the MNN application on the inviter's mobile electronic device may then, by reference to the log file, push the file to the invitee's mobile electronic device via the direct wireless connection.

Alternatively, in other embodiments, after the MNN application is installed on the invitee's mobile electronic device, the invitee may start the MNN application to initiate the transferring of the file that the inviter wishes to share. The MNN application on the invitee's mobile electronic device may check the short message to find what file the inviter wishes to share, and then connect to the inviter's mobile electronic device to retrieve the file.

In some embodiments, the inviter may also send an invitation to the invitee to merely invite the invitee to install the MNN application without sharing a file immediately. In these embodiments, the inviter may click on the invitation button 221 in the invitation area 220, and then enter the mobile electronic device number of the receiving mobile electronic device, i.e., the invitee's mobile electronic device. The rest steps are similar to those described above, except the process of transferring the file to be shared.

In the embodiments described above, a short message is used for carrying the invitation to use the MNN application. Usually, this may require that the mobile electronic devices have access to short message services. For example, the mobile electronic devices may be cell phones and be connected in a cellular network, such as, for example, a GSM network, an LTE network, or a CDMA network. However, in other embodiments, an invitation may be sent without using short messages. For example, the invitation may be sent by an email. The email may contain information similar to that contained in the short message described above.

In some embodiments, if the invitee's mobile electronic device is equipped with a camera, an invitation may also be realized by using the camera. In these embodiments, the inviter may use the MNN application on his/her mobile electronic device to generate a bar code, which may be displayed on the screen of his/her mobile electronic device. The bar code may be a one-dimensional bar code or a two-dimensional bar code, and may contain codes representing the downloading address of the installation key. The invitee may use the camera on his/her mobile electronic device to scan the bar code to obtain the downloading address of the installation key. The rest steps are similar to those in the embodiments described above.

In the embodiments described above, the invitee's mobile electronic device may have access to a WAN or the internet. In these embodiments, there may be some limitations for the invitee's mobile electronic device to download large files from a server on the WAN or the internet. For example, the downloading speed may be too slow, or the access service provider may charge by traffic. Therefore, in the embodiments described above, a small-size installation key is downloaded to the invitee's mobile electronic device from the server, rather than the complete, large-size installation file. However, in other embodiments, for example, if the traffic is not a concern, the invitee's mobile electronic device may download the complete installation file directly from the server on the WAN or the internet. In these embodiments, the invitation may contain a URL to the location on the WAN or the internet where the complete installation file is stored.

In some embodiments, the invitee's mobile electronic device may not be connected to a WAN or the Internet, but connected in a wireless local area network (WLAN), in which the inviter's mobile electronic device is also connected. Mobile electronic devices in the WLAN may be connected via one or more routers. In these embodiments, the invitation sent to the invitee's mobile electronic device may contain a URL for the complete installation file. When the invitee's mobile electronic device receives the invitation, it may request to download the complete installation file according to the URL. In some embodiments, the URL may comprise an IP address of the inviter's mobile electronic device and a path to the location where the complete installation file is saved on the inviter's mobile electronic device.

Consistent with embodiments of the present disclosure, files may be shared between two, or among three or more, mobile electronic devices having the MNN application installed thereon. In some embodiments, a sharing user who wishes to share a file may drag the file into the connection and sharing area 210 on his/her mobile electronic device by performing a gesture of pressing on an icon representing the file to be shared and moving the icon to the connection and sharing area 210. In some embodiments, the file may be sent to all the mobile electronic devices listed in the connection and sharing area 210. In other embodiments, the sharing user may choose, from the listing of icons 212, one or more receiving mobile electronic devices with which the file will be shared. In some embodiments, when the file is dragged into the connection and sharing area 210 on the sharing user's mobile electronic device, the file may be automatically transferred to the one or more receiving mobile electronic devices. In other embodiments, when the file is dragged into the connection and sharing area 210, a notification may be sent to the one or more receiving mobile electronic devices. A window may pop up on the receiving mobile electronic devices asking the receiving user whether to accept the file. Transferring the file may comprise, for example, the sharing user's mobile electronic device sending a downloading invitation to the receiving mobile electronic device, and the receiving mobile electronic device acknowledging and connecting to the sharing user's mobile electronic device to download the file.

Figure 5A:
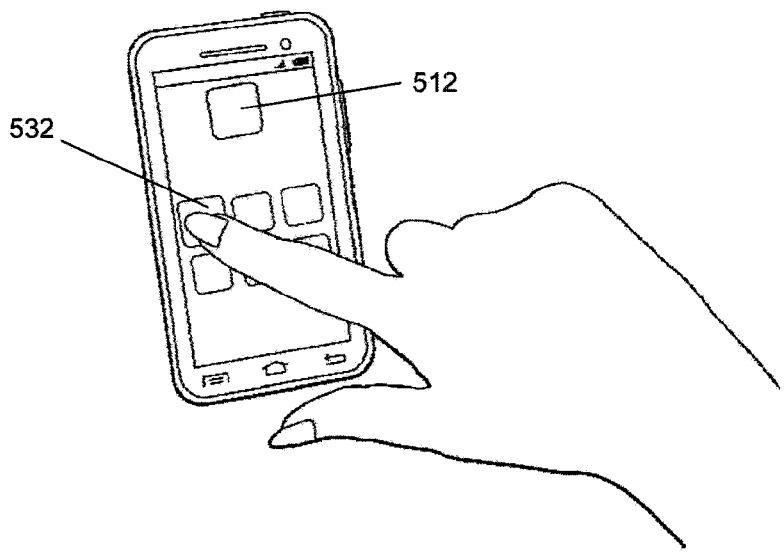
FIGS. 5(a)-5(c) are schematic views showing a process for sharing files consistent with embodiments of the present disclosure.
Figure 5B:
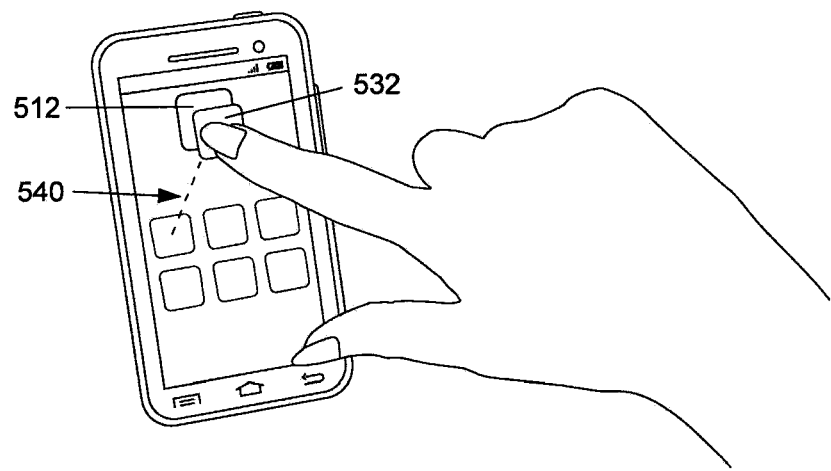
Figure 5C:
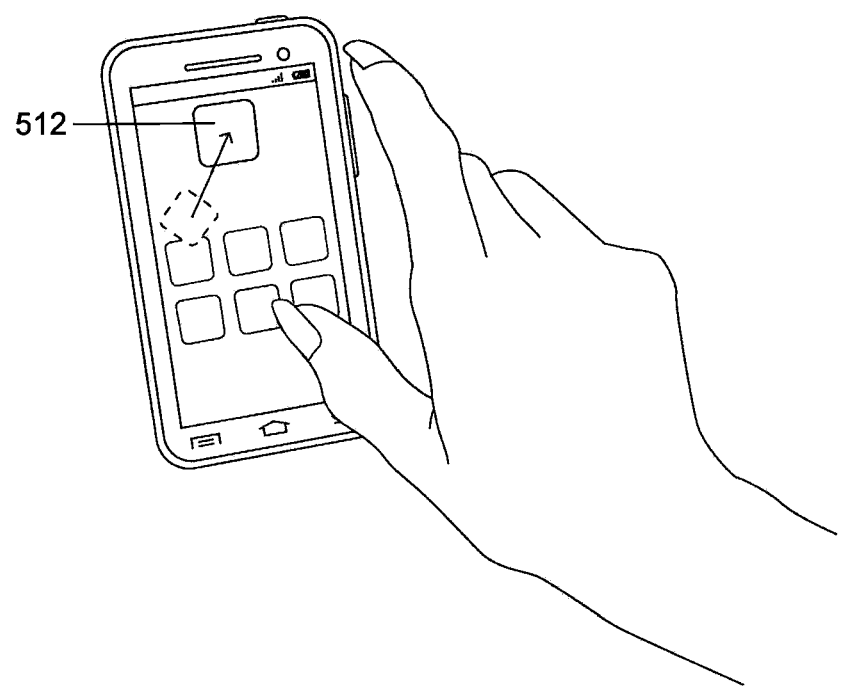

Besides the methods described above, a sharing user may choose which mobile electronic device to receive the file being shared by dragging and releasing the icon representing the file being shared to the icon representing the mobile electronic device that is to receive the file. For example, as shown in FIG. 5(a), the sharing user first presses and holds an icon 532 in the user interface representing a file to be shared, and then moves the icon 532 towards an icon 512 in the user interface representing the mobile electronic device that is to receive the file, along a direction indicated by dashed line 540 (see FIG. 5(b)). After the icon 532 is moved over the icon 512, the sharing user releases the contact with the icon 532, as shown in FIG. 5(c). The file represented by the icon 532 will then be transferred to the mobile electronic device represented by icon 512.

Other methods may also be used to trigger file sharing. In some embodiments, the sharing user may click on an icon for the file he/she wishes to share, which may trigger a pop-up menu containing a "share" option. The sharing user may then select the "share" option in the pop-up menu to share the file.

Figure 6A:
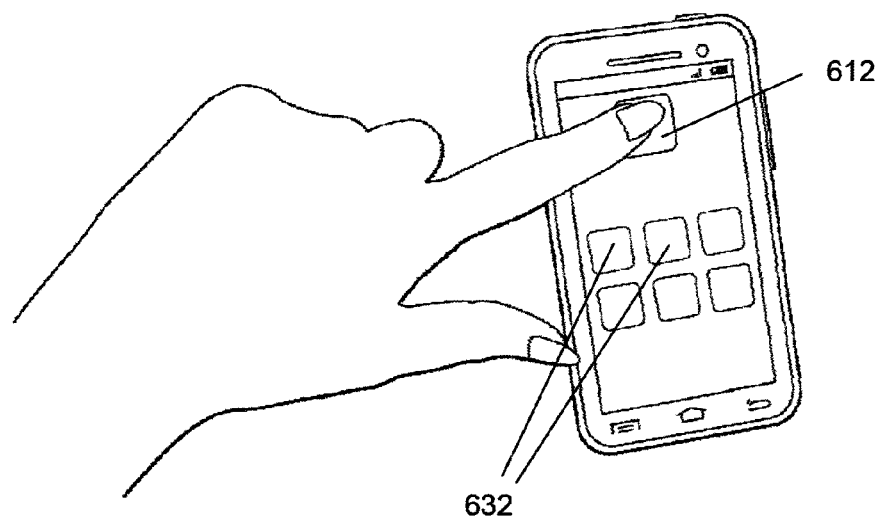
FIGS. 6(a) and 6(b) are schematic views showing another process for sharing files consistent with embodiments of the present disclosure.
Figure 6B:
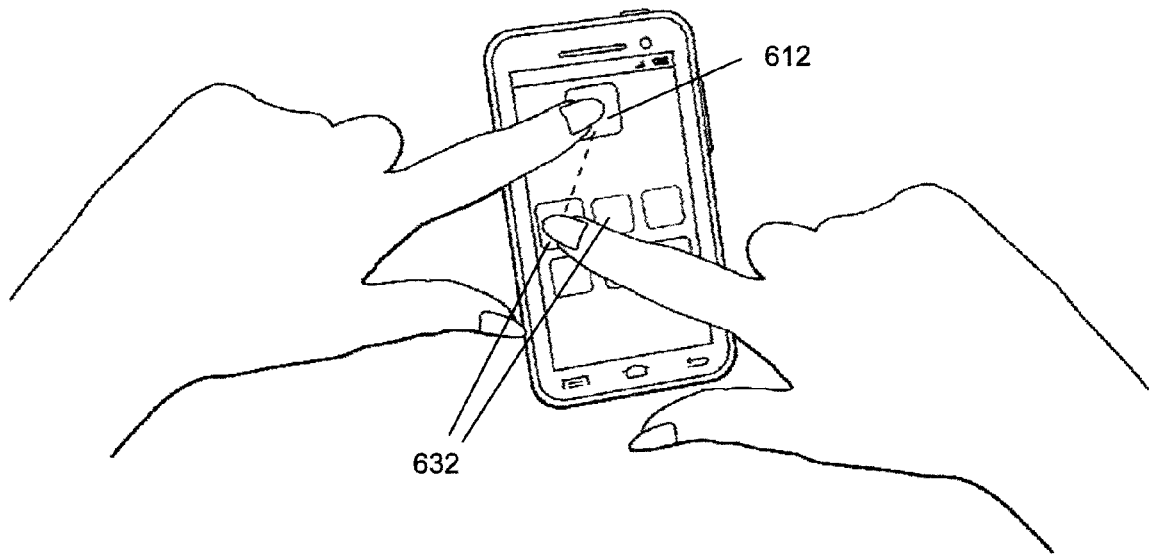

In other embodiments, files may be shared by pressing and holding one or more of the icons in the connection and sharing area, such as icons 212 shown in FIGS. 2(b)-2(f), to select one or more receiving mobile electronic devices, and then (while still pressing and holding the icon(s)), click on the icon or icons representing the file or files he/she wishes to share with the receiving mobile electronic device(s). When the sharing user releases the one or more icons 212, the selected file or files may be transferred to the one or more receiving mobile electronic devices. For example, as shown in FIG. 6(a), the sharing user first presses and holds an icon 612 representing another mobile electronic device connected to the sharing user's mobile electronic device. Then, as shown in FIG. 6(b), while still pressing and holding the icon 612, the sharing user clicks on an icon 632 representing a file to be shared to select the file. The sharing user may also click on multiple icons 632 to select multiple files to be shared. When the sharing user releases icon 612, the file represented by icon 632 will be transferred to the mobile electronic device represented by icon 612.

Consistent with embodiments of the present disclosure, the mobile electronic device 110 may have an acceleration sensor installed thereon. The acceleration sensor may output a signal indicating the acceleration of the mobile electronic device 110. The MNN application may monitor the output signal from the acceleration sensor, and trigger an instruction when a peak in the output signal is detected. For example, the peak may appear when the user swings the mobile electronic device 110. In some embodiments, the instruction may be an instruction to perform a next step in a process comprising a series of steps. For example, when the mobile electronic device 110 is connected with other mobile electronic devices, if the user swings the mobile electronic device 110 while pressing and holding the icon for a file he/she wishes to share, the MNN application may start to send the file to the mobile electronic devices listed in the connection and sharing area 210. This process is schematically shown in FIG. 7.

Figure 7:
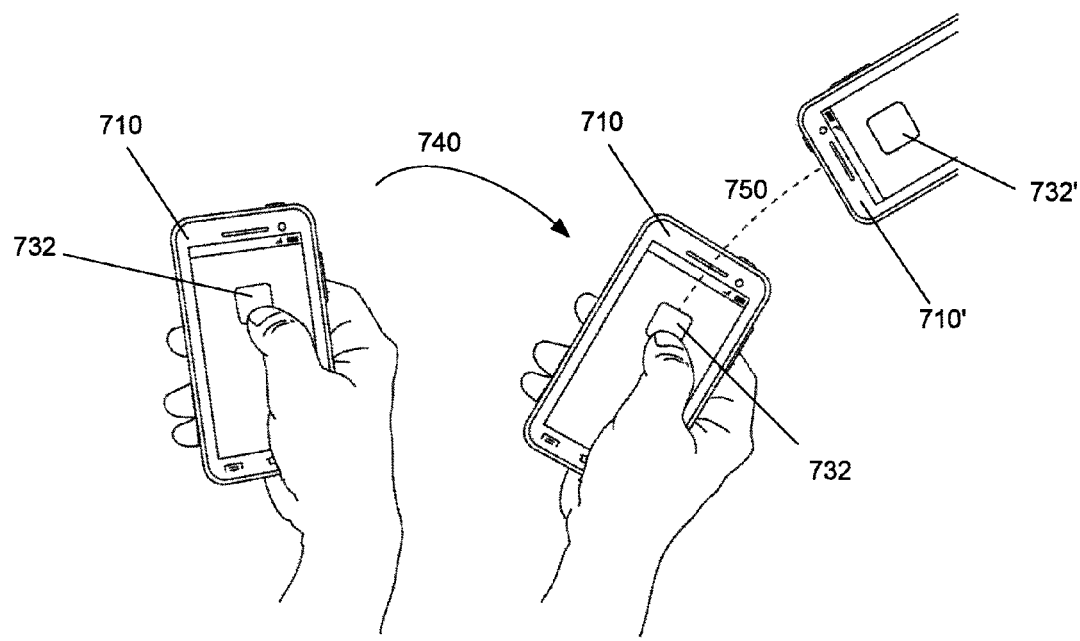
FIG. 7 is a schematic view showing a process for triggering transferring of a file consistent with embodiments of the present disclosure.

As shown in FIG. 7, when the user of a first mobile electronic device 710 wishes to share a file with the user of a second mobile electronic device 710', he/she first presses and holds an icon 732 in the interface on the first mobile electronic device 710, where the icon 732 represents the file to be shared, and then swings the mobile electronic device 710 in direction 740. This action triggers the transfer of the file represented by icon 732 from the first mobile electronic device 710 to the second mobile electronic device 710', as imaginarily shown by dash line 750. After the transfer is completed, an icon 732' representing the file being transferred appears in the interface on the second mobile electronic device 710'. From the user experience point of view, this process is like "throwing" or "tossing" a file from one mobile electronic device to another mobile electronic device or other mobile electronic devices.

The peak signal generated by the acceleration sensor may also be used to trigger other steps. For example, when the mobile electronic device 110 is not connected with any other mobile electronic devices, if the user swings the mobile electronic device 110 while pressing and holding the icon for a file he/she wishes to share, the MNN application may generate an installation invitation to be sent to another mobile electronic device. In some embodiments, the instruction may be predefined by the user.

In some embodiments, the functions realized by physically swinging the mobile electronic device 110 may also be realized by performing a "flicking" gesture on the screen of the mobile electronic device 110. In these embodiments, the "flicking" gesture may comprise the following actions: pressing and holding an icon for a file in the user interface of the MNN application installed on the mobile electronic device 110, quickly moving toward one direction, such as moving toward the connection and sharing area 210, and then quickly releasing the contact with the screen. By flicking selected file toward the connection and sharing area 210, the MNN application may trigger the performing of a next step in a process comprising a series of steps, such as transferring a file from the sharing user's mobile electronic device 110 to another mobile electronic device or generating an installation invitation to be sent to another mobile electronic device, similar to the steps triggered by swinging the mobile electronic device described above.

Figure 8A:
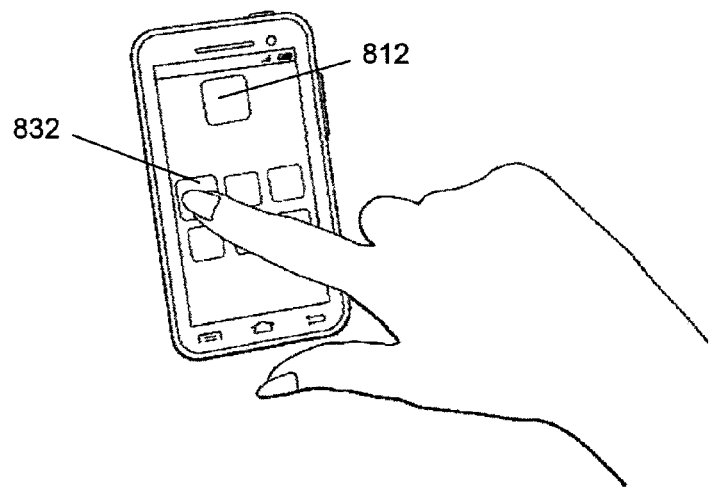
FIGS. 8(a)-8(c) are schematic views showing another process for triggering transferring of a file consistent with embodiments of the present disclosure.
Figure 8B:
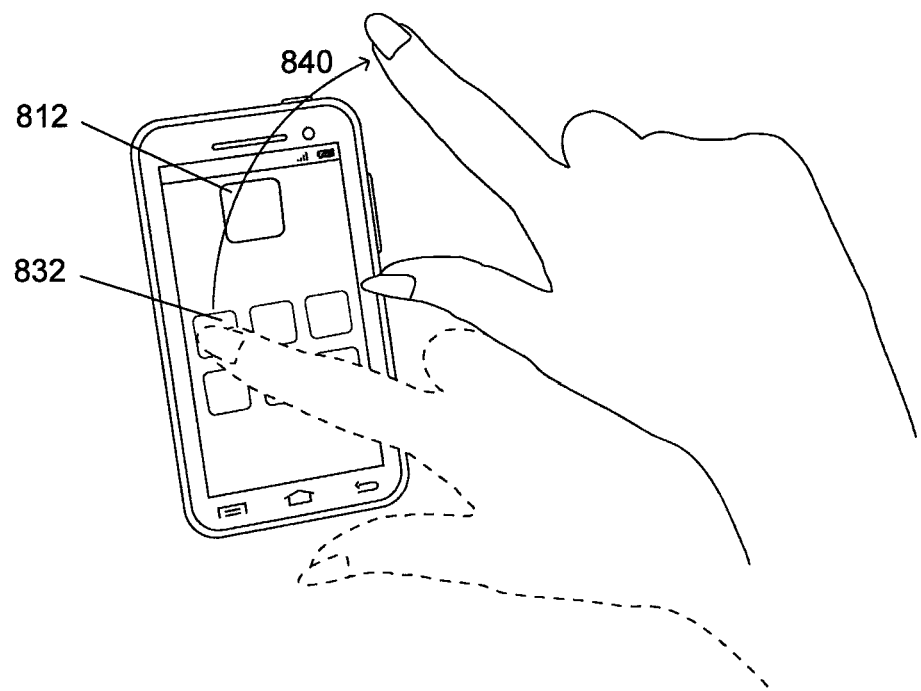
Figure 8C:
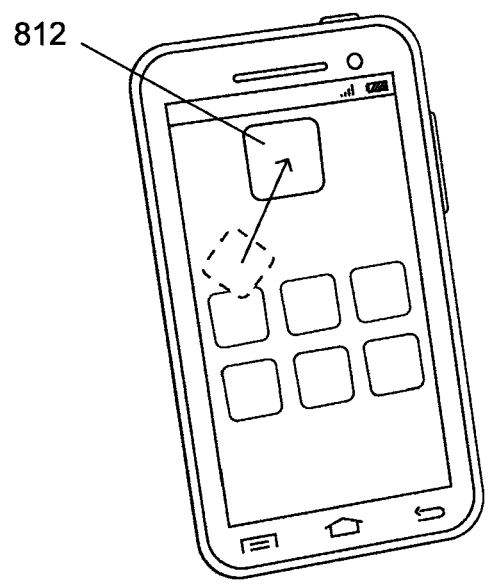

FIGS. 8(*a*)-8(*c*) show an example of sharing a file by performing a "flicking" gesture. As shown in FIG. 8(*a*), the sharing user first presses and holds an icon 832 for a file in the user interface on the sharing user's mobile electronic device, by contacting a screen of the mobile electronic device at the icon 832. Then, as shown in FIG. 8(*b*), the sharing user quickly moves the contact toward the connection and sharing area, by quickly moving his/her finger toward a direction indicated by an arrow line 840. During the moving of his/her finger, the sharing user quickly releases the contact with the screen. This "flicking" gesture triggers transferring of the file represented by icon 832 to the mobile electronic device represented by icon 812.

Figure 9:
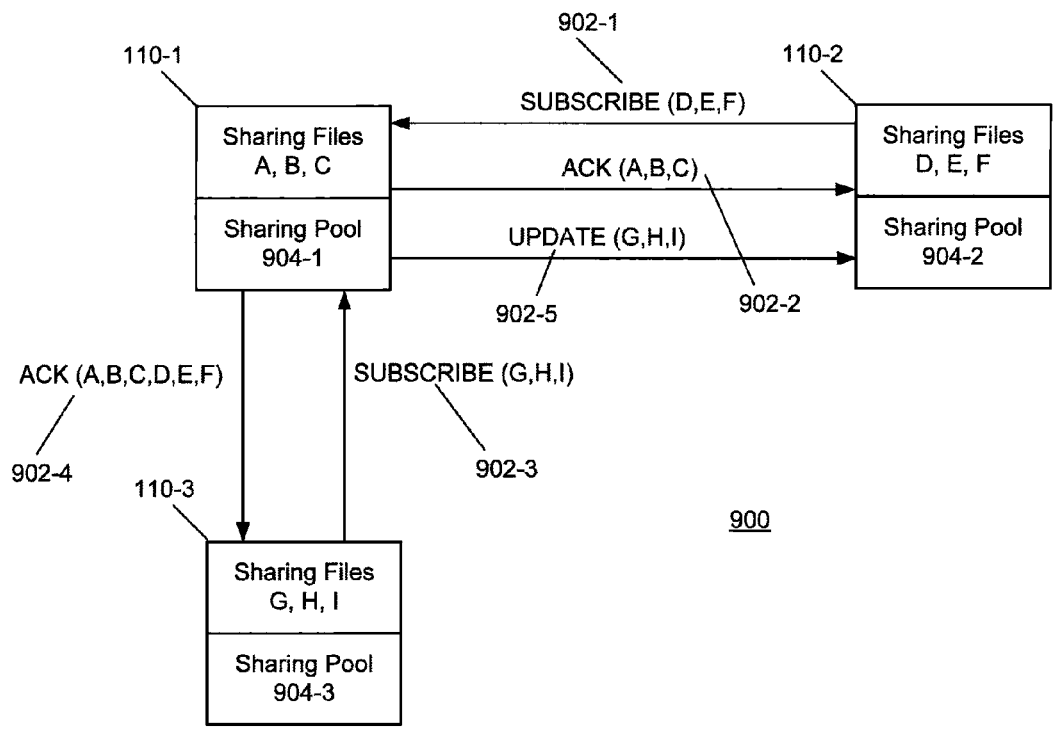
FIG. 9 is a schematic view of a mesh network consistent with embodiments of the present disclosure.

Consistent with embodiments of the present disclosure, file sharing among mobile electronic devices in a mesh network may also be realized by using a sharing pool. FIG. 9 shows an exemplary mesh network 900 comprising mobile electronic devices 110-1, 110-2, and 110-3 consistent with embodiments of the present disclosure. Each of the mobile electronic devices 110-1, 110-2, and 110-3 may contain certain files that can be shared with other mobile electronic devices. For example, files A, B, and C on the mobile electronic device 110-1 are to be shared; files D, E, and F on the mobile electronic device 110-2 are to be shared; and files G, H, and I on the mobile electronic device 110-3 are to be shared.

In this example, the mesh network 900 is initiated by the mobile electronic device 110-1. The mobile electronic device 110-2 requests to connect with the mobile electronic device 110-1 by sending a SUBSCRIBE message 902-1 to the mobile electronic device 110-1. The SUBSCRIBE message 902-1 may contain information about the files the mobile electronic device 110-2 will share (i.e., files D, E, and F). When the mobile electronic device 110-1 receives the SUBSCRIBE message 902-1, it records the information about files D, E, and F in a sharing pool 904-1, and responds with an ACK message 902-2. The ACK message 902-2 may contain information about the files the mobile electronic device 110-1 will share (i.e., files A, B, and C). When the mobile electronic device 110-2 receives the ACK message 902-2, it records the information about files A, B, and C in a sharing pool 904-2.

Similarly, when the mobile electronic device 110-3 requests to join the mesh network 900, it sends a SUBSCRIBE message 902-3 to the mobile electronic device 110-1. The SUBSCRIBE message 902-3 may contain information about the files the mobile electronic device 110-3 will share (i.e., files G, H, and I). When the mobile electronic device 110-1 receives the SUBSCRIBE message 902-3, it records the information about files G, H, and I in the sharing pool 904-1, and responds with an ACK message 902-4. The ACK message 902-4 may contain information about the files currently in the sharing pool 904-1 (i.e., files A, B, C, D, E, and F). When the mobile electronic device 110-3 receives the ACK message 902-4, it records the information about files A, B, C, D, E, and F in a sharing pool 904-3. The mobile electronic device 110-1 also forwards the information about files G, H, and I to the mobile electronic device 110-2 by using an UPDATE message 902-5 sent from the mobile electronic device 110-1 to the mobile electronic device 110-2. When receiving the UPDATE message 902-5, the mobile electronic device 110-2 records the information about files G, H, and I in the sharing pool 904-2.

By using sharing pools, a user of a mobile electronic device can easily control what files he/she is willing to share, and can easily view what other users of the mobile electronic devices in the same mesh network are sharing.

Consistent with embodiments of the present disclosure, the sharing pools of all the mobile electronic devices in the same mesh network may contain the same information. At the time of building the sharing pool in one mobile electronic device, it may not be necessary that the files being shared by other mobile electronic devices are actually saved on that one mobile electronic device. Only the file information of the files being shared may be recorded in the sharing pool. A user of any of the mobile electronic devices 110-1, 110-2, and 110-3 may request any file having its file information recorded in the sharing pool. For example, when the user of the mobile electronic device 110-3 wishes to receive a copy of, for example, file D saved on the mobile electronic device 110-2, he/she may instruct the mobile electronic device 110-3 to generate and send a request to the mobile electronic device 110-2. The mobile electronic device 110-2 may respond with an INVITE message, which may contain the file name of file D and the link to a downloading location of file D. The downloading location of file D may be a storage location of file D on the mobile electronic device 110-2. The link may be a uniform resource locator (URL). The mobile electronic device 110-3 may then download file D from the downloading location according to the URL and the file name.

Consistent with embodiments of the present disclosure, when the receiving mobile electronic device receives a file, the file may be automatically displayed on the history page 235 of the receiving mobile electronic device. If the file is an installation file for an application, for example, a game, the receiving user may click on it to install the application.

Figure 10:
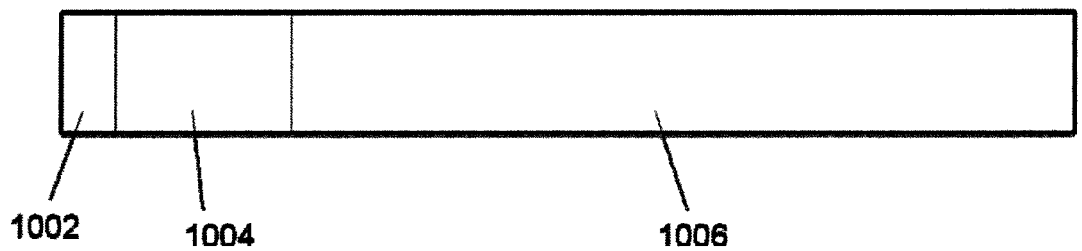
FIG. 10 schematically shows a service set identifier (SSID) consistent with embodiments of the present disclosure.

The MNN application consistent with embodiments of the present disclosure uses a special SSID, such as SSID 2351 shown in FIG. 2(*f*), to identify a mobile electronic device. FIG. 10 shows an exemplary structure of an SSID 1000 consistent with embodiments of the present disclosure. The SSID 1000 includes three parts: a first fixed-length part 1002 comprising one byte, a second fixed-length part 1004 comprising four bytes, and a variable-length part 1006 comprising one to 27 bytes depending on need. Therefore, the total length of the SSID 1000 may be six bytes to 32 bytes.

The first fixed-length part 1002 represents whether the variable-length part 1006 is encoded. For example, the one byte in the first fixed-length part 1002 may include a letter "D" to represent that the variable-length part 1006 is encoded. On the other hand, the one byte in the first fixed-length part 1002 may include a letter "I" to represent that the variable-length part 1006 is not encoded. Of course, other characters may also be used instead of "D" and "I."

The second fixed-length part 1004 may comprise the last four digits of the media access control (MAC) address of the mobile electronic device.

The variable-length part 1006 may represent a user name of a user using the mobile electronic device. The length of the variable-length part 1006 may be as short as one byte, or as long as 27 bytes. Consistent with embodiments of the present disclosure, the variable-length part 1006 may be encoded or not encoded. As mentioned above, whether the variable-length part 1006 is encoded may be represented in the first fixed-length part 1002. The variable-length part 1006 may be encoded by a base64 encoding scheme. The encoded variable-length part 1006 may be a combination of characters selected from a set of characters including all upper-case English letters, all lower-case English letters, numbers 0 to 9, and two symbols "+" and "/".

Figure 11:
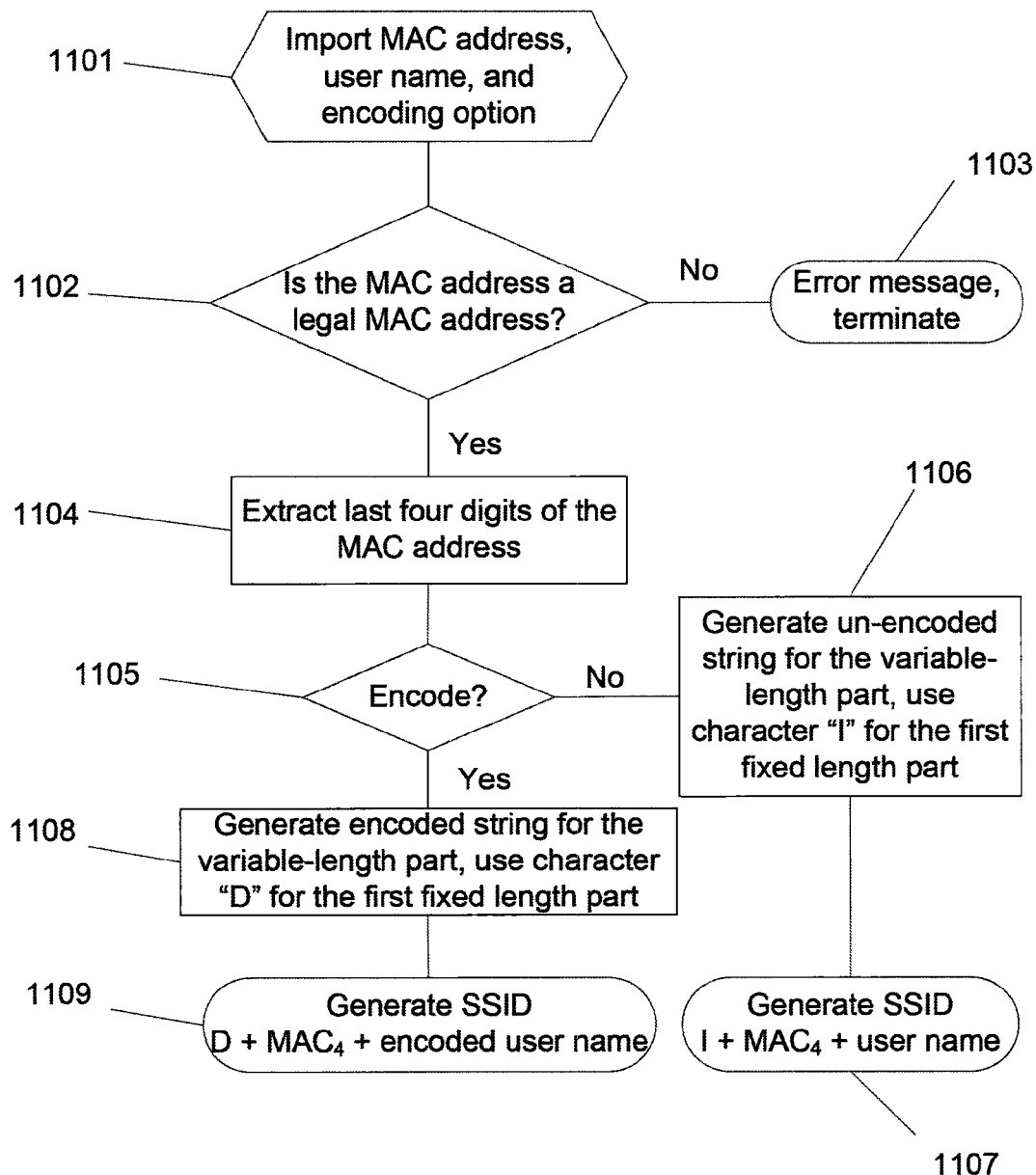
FIG. 11 is a flow chart showing a process of generating an SSID consistent with embodiments of the present disclosure.

FIG. 11 shows a flowchart for the process of generating an SSID consistent with embodiments of the present disclosure. At Step 1101, the MAC address of the mobile electronic device, the user name, and the encoding option (i.e., whether to encode the user name) are imported into a generating module of the MNN application installed on the mobile electronic device. At Step 1102, the generating module checks whether the MAC address is a legal MAC address. If not, the generating module generates an error message and terminate the SSID generation process (Step 1103). If the MAC address is a legal MAC address, the generating module extracts the last four digits of the MAC address $MAC_4$ for the second fixed-length part 1004 (Step 1104).

At Step 1105, it is determined whether the user name is to be encoded. In some embodiments, whether to encode user names is preset when configuring MNN application installed on the mobile electronic device, and a flag is set to indicate whether user names are to be encoded. When a determination needs to be made, the generating module checks the flag to determine whether to encode the user name. In some embodiments, when a determination needs to be made, a dialogue window may pop up, asking the user whether to encode the user name. Disabling encoding may allow a longer readable variable-length SSID, while encoding may avoid random binaries in an SSID.

At Step 1105, if it is determined not to encode, the process goes to Step 1106, where an un-encoded string is generated to be used as the variable-length part 1006, and the character representing no encoding, for example, "I", is chosen for the first fixed-length part 1002. Then, at Step 1107, the SSD 1000 is generated, which comprises character "I", $MAC_4$, and the un-encoded string.

If, at Step 1105, it is determined that the user name needs to be encoded, the process proceeds to Step 1108, where an encoded string is generated to be used as the variable-length part 1006, and the character representing encoding, for example, "D", is chosen for the first fixed-length part 1002. Then, at Step 1109, the SSID 1000 is generated, which comprises character "D", $MAC_4$, and the encoded string.

Figure 12:
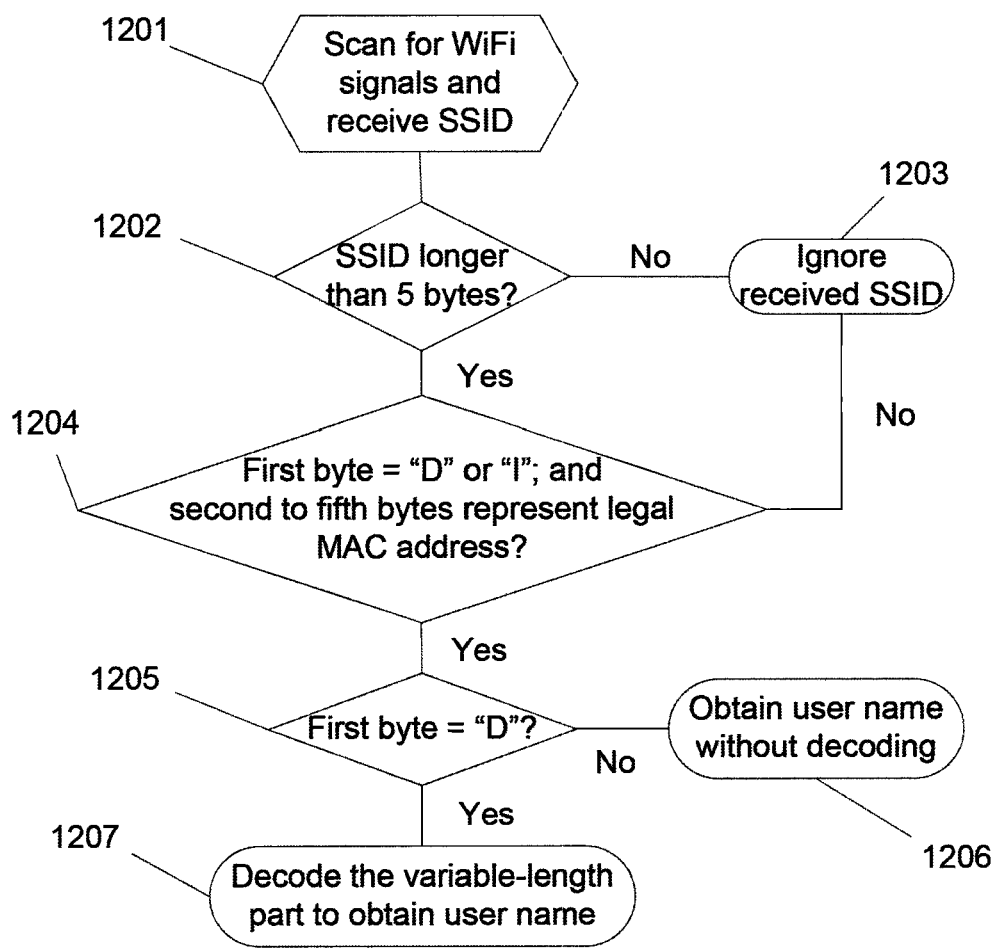
FIG. 12 is a flow chart showing a process of obtaining a user name carried by an SSID.

FIG. 12 shows a flowchart for the process of obtaining a user name carried by an SSID received by a receiving mobile electronic device consistent with embodiments of the present disclosure. The SSID may be an SSID of another mobile electronic device that having established an access point network.

At Step 1201, the mobile electronic device scans for WiFi signals and receives the SSID. At Step 1202, a decoding module of the MNN application installed on the receiving mobile electronic device checks whether the length of the received SSID is longer than five bytes. If not, the decoding module ignores the received SSID and terminates the process (Step 1203). If the received SSID is longer than five bytes, the decoding module goes further to check whether the first byte is a character defined to represent whether encoding is performed, e.g., "D" or "I" in some embodiments, and to check whether the second to fifth bytes represent legal MAC address (Step 1204). If any of the checking results is no, the process goes to Step 1203, where the decoding module ignores the received SSID and terminates the process.

If at Step 1204, it is determined that the first byte of the received SSID is a character defined to represent whether encoding is performed, and that the second to fifth bytes represent legal MAC address, it is further checked whether the first byte is "D" (Step 1205). If not, it means that the variable-length part of the received SSID is an un-encoded string, i.e., the user name carried by the received SSID is not encoded. Therefore, the user name carried by the received SSID is directly obtained from the variable-length part without decoding (Step 1206). If, at Step 1205, it is determined that the first byte of the SSID is "D", which means the variable-length part of the received SSID is an encoded string, the process proceeds to Step 1207. The variable-length part of the received SSID, i.e., from the sixth byte to the last byte of the received SSID, is decoded using a Base64 decoding method to obtain the user name (Step 1207).

In some embodiments, the user name obtained by the method shown in FIG. 12 may be displayed on the receiving mobile electronic device in addition to, or in place of, the SSID 2351.

Consistent with embodiments of the present disclosure, one or more non-transitory computer-readable storage medium storing the MNN application are provided. The one or more non-transitory storage medium may be installed on a mobile electronic device or provided separately from the mobile electronic device, such as on a personal computer or a network-attached storage (NAS). A mobile electronic device may execute the MNN application to perform the steps of the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be a semiconductor storage medium, such as DRAM, SRAM, EPROM, EEPROM, flash memory, or memory stick.

Other embodiments of the present disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of meshed file sharing by building sharing pools in at least a first mobile electronic device and a second mobile electronic device in a process of establishing a mesh network formed by at least the first and second mobile electronic devices, the method comprising:

sending, by the first mobile electronic device, a first connection request to the second mobile electronic device, the first connection request containing first file information about a first file to be shared by the first mobile electronic device, the first file information including a link to a downloading location of the first file, and the first file being accessible directly from the first mobile electronic device;

receiving, by the first mobile electronic device, first acknowledgement message from the second mobile electronic device, the first acknowledgement message containing second file information about a second file to be shared by the second mobile electronic device, the second file information including a link to a downloading location of the second file, and the second file being accessible directly from the second mobile electronic device;

storing, by the first mobile electronic device, the first file information and the second file information in a first sharing pool in the first mobile electronic device;

storing, by the second mobile electronic device, the first file information and the second file information in a second sharing pool in the second mobile electronic device;

receiving, by the second mobile electronic device, a second connection request from a third mobile electronic device, the second connection request containing third file information about a third file to be shared by the third mobile electronic device;

storing, by the second mobile electronic device, the third file information in the second sharing pool;

sending, by the second mobile electronic device, a second acknowledgement message to the third mobile electronic device, the second acknowledgement message containing the first file information and the second file information; and sending, by the second mobile electronic device, an update message to the first mobile electronic device, the update message containing the third file information, wherein the first sharing pool and the second sharing pool store same file information.

2. The method according to claim 1, further comprising:
sending, by the first mobile electronic device, a downloading request to the second mobile electronic device according to the second file information; and
downloading, by the first mobile electronic device, the second file from the second mobile electronic device.

3. The method according to claim 2, further comprising:
displaying, by the first mobile electronic device, an icon representing the second file on a history page on screen of the first mobile electronic device.

4. The method according to claim 1, further comprising:
storing, by the third mobile electronic device, the first file information, the second file information, and the third file information in a third sharing pool in the third mobile electronic device.

5. The method according to claim 1, further comprising:
storing, by the first mobile electronic device, the third file information in the first sharing pool.

6. The method according to claim 1, wherein each of the first and second sharing pools stores the first and second file information without storing the first and second files to be shared.

7. The method according to claim 6, wherein the first file information is different from the first file to be shared, and the second file information is different from the second file to be shared.

8. A method of meshed file sharing by building sharing pools in at least a first mobile electronic device and a second mobile electronic device in a process of establishing a mesh network formed by at least the first and second mobile electronic devices, the method comprising:

receiving, by the second mobile electronic device, an electronic message from the first mobile electronic device, the message including a download link indicating a storing location of an installation key and a service set identifier (SSID) of the first mobile electronic device;

downloading, by the second mobile electronic device, the installation key;

executing the installation key to install an installation application on the second mobile electronic device;

retrieving, by the installation application on the second mobile electronic device, the SSID of the first mobile electronic device;

searching, by the installation application on the second mobile electronic device, for the first mobile electronic device using the SSID by searching for wireless signals sent by the first mobile electronic device;

establishing, by the installation application on the second mobile electronic device, a direct wireless connection between the first and second mobile electronic devices after the wireless signals from the first mobile electronic device is detected;

sending, by the installation application on the second mobile electronic device, a request for an installation file to the first mobile electronic device via the direct wireless connection, the installation file being configured to install a file sharing application;

receiving, by the second mobile electronic device, the installation file from the first mobile electronic device via the direct wireless connection;

executing, by the second mobile electronic device, the installation file to install the file sharing application on the second mobile electronic device;

sending, by the first mobile electronic device, first file information to the second mobile electronic device, the first file information being about a first file to be shared by the first mobile electronic device and including a link to a downloading location of the first file, and the first file being accessible directly from the first mobile electronic device;

receiving, by the first mobile electronic device, a first acknowledgement message from the second mobile electronic device, the first acknowledgement message containing second file information about a second file to be shared by the second mobile electronic device, the second file information including a link to a downloading location of the second file, and the second file being accessible directly from the second mobile electronic device;

storing, by the first mobile electronic device, the first file information and the second file information in a first sharing pool in the first mobile electronic device;

storing, by the second mobile electronic device, the first file information and the second file information in a second sharing pool in the second mobile electronic device;

receiving, by the second mobile electronic device, third file information from a third mobile electronic device, the third file information being about a third file to be shared by the third mobile electronic device;

storing, by the second mobile electronic device, the third file information in the second sharing pool;

sending, by the second mobile electronic device, a second acknowledgement message to the third mobile electronic device, the second acknowledgement message containing the first file information and the second file information; and sending, by the second mobile electronic device, an update message to the first mobile electronic device, the update message containing the third file information, wherein the first sharing pool and the second sharing pool store same file information.

9. The method according to claim 8, further comprising:
sending, by the first mobile electronic device, a downloading request to the second mobile electronic device according to the second file information; and
downloading, by the first mobile electronic device, the second file from the second mobile electronic device.

10. The method according to claim 9, further comprising:
displaying, by the first mobile electronic device, an icon representing the second file on a history page on screen of the first mobile electronic device.

11. The method according to claim 8, further comprising:
storing, by the third mobile electronic device, the first file information, the second file information, and the third file information in a third sharing pool in the third mobile electronic device.

12. The method according to claim 8, further comprising:
storing, by the first mobile electronic device, the third file information in the first sharing pool.

* * * * *